United States Patent

[11] 3,625,342

[72] Inventor Robert W. Clyne
 5701 Sheridan Road, Chicago, Ill. 60626
[21] Appl. No. 851,982
[22] Filed Aug. 21, 1969
[45] Patented Dec. 7, 1971

[54] FLIGHT CONSTRUCTION
 3 Claims, 6 Drawing Figs.
[52] U.S. Cl. .................................................. 198/174
[51] Int. Cl. ..................................................... B65g 19/22
[50] Field of Search ......................................... 198/174, 175, 154

[56] References Cited
UNITED STATES PATENTS
1,550,365 8/1925 Jones ........................... 198/174 X
1,726,065 10/1929 Greenleaf ..................... 198/175 UX
2,846,053 8/1958 Hyman ......................... 198/175
2,858,012 10/1958 Kepkay ........................ 198/174 X
3,303,920 2/1967 Clyne ........................... 198/154

Primary Examiner—Joseph Wegbreit
Assistant Examiner—Bruce H. Stoner, Jr.
Attorney—Pendleton, Neuman, Williams & Anderson ABSTRACT: A flight is provided for use in an apparatus which is adapted to handle waste products or the like that have accumulated on a surface. The flight is connected to and forms a part of a conveyor means and is adapted to move across the surface and remove the accumulated waste therefrom. The configuration of the flight is such that it has a short moment arm whereby the overturning moment of force encountered by the flight when in moving contact with the accumulated waste is small.

PATENTED DEC 7 1971
3,625,342
SHEET 1 OF 2
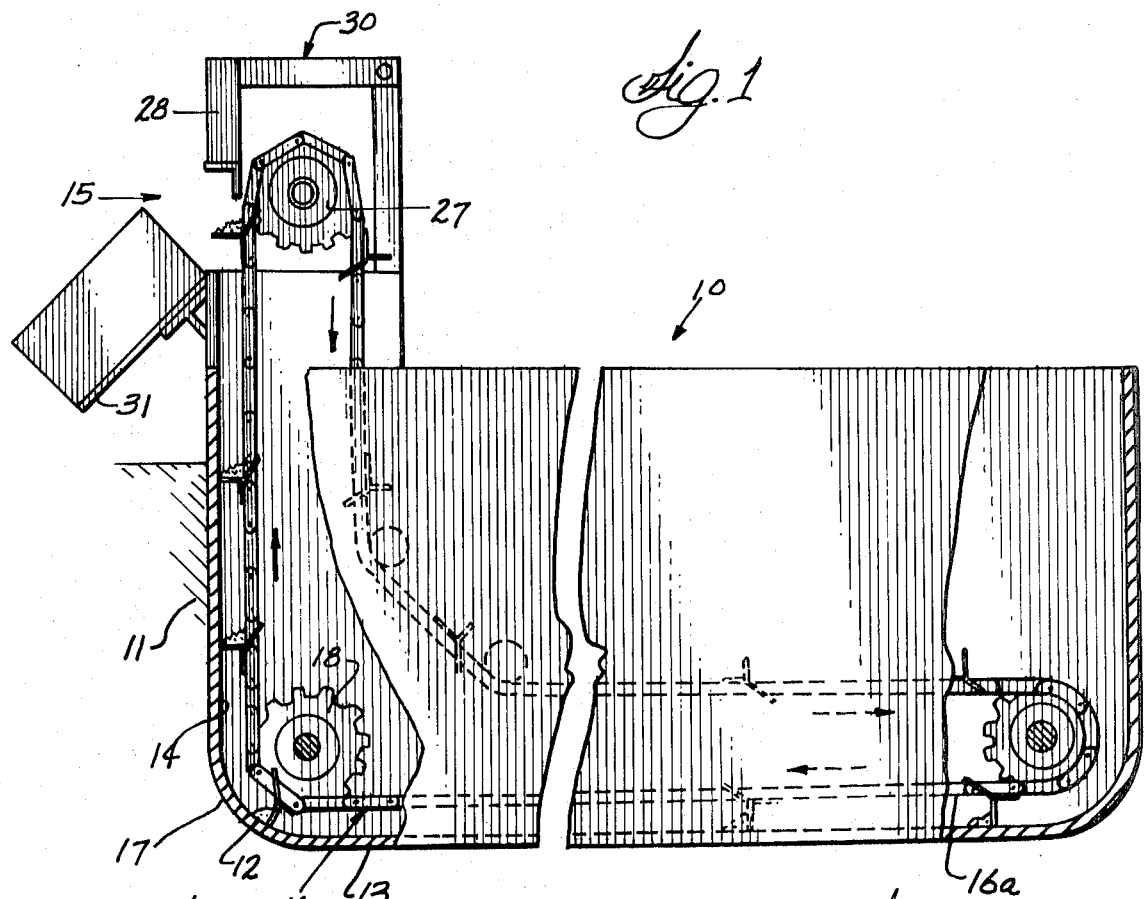
Fig.1
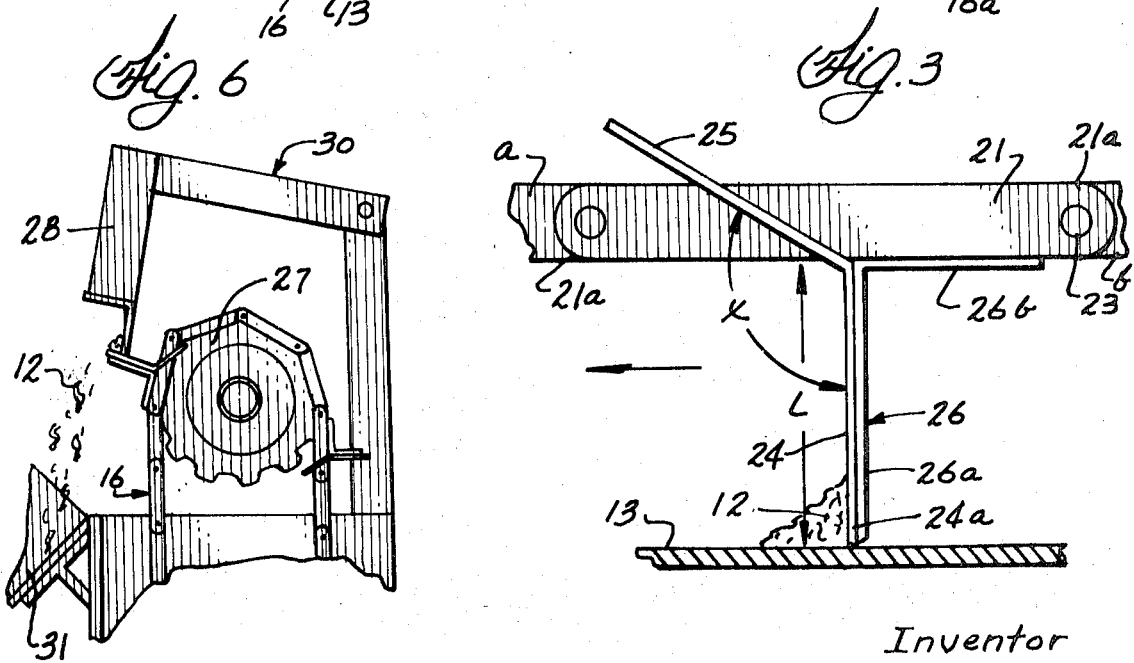
Fig. 6
Fig. 3
Inventor
Robert W. Clyne
By Pendleton, Neuman,
Seibold & Williams
Attorneys

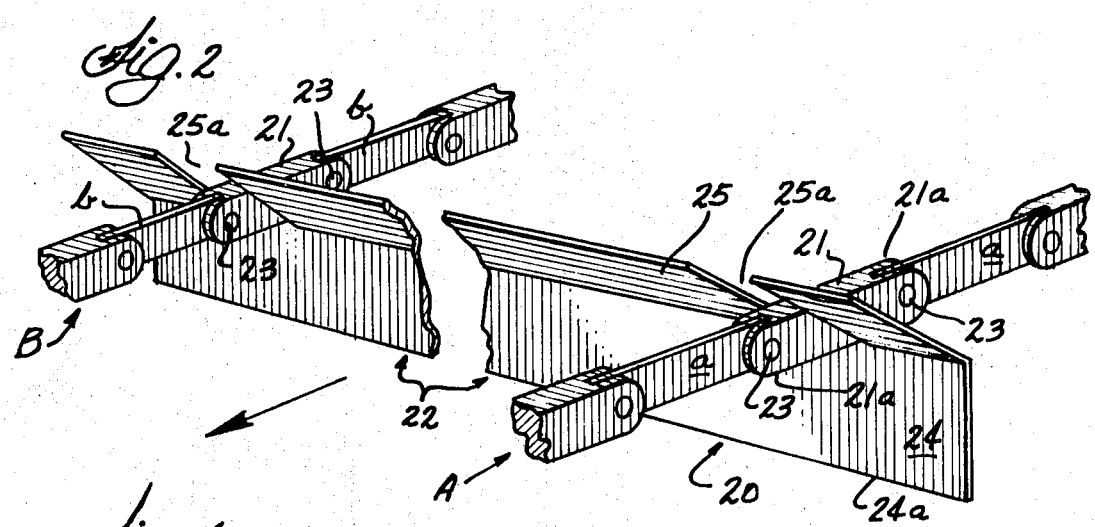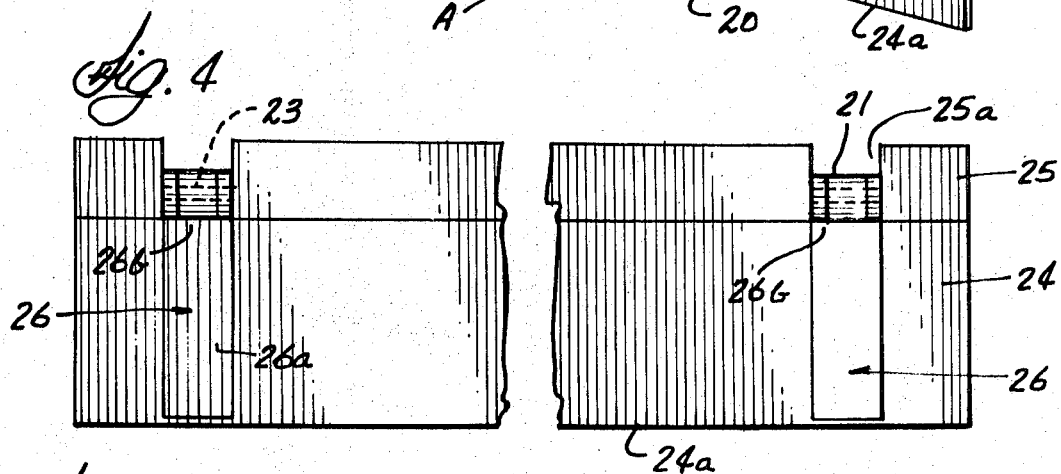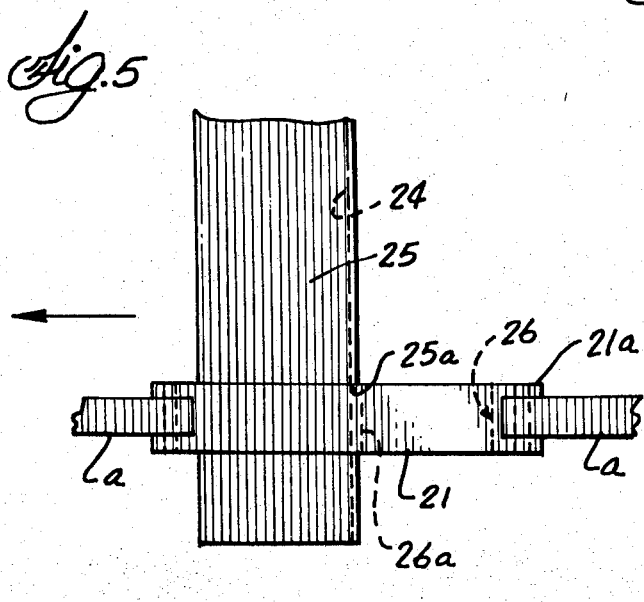

FLIGHT CONSTRUCTION

BACKGROUND OF THE INVENTION

In various industrial operations substantial amounts of waste products are oftentimes produced which cause serious problems unless they are effectively disposed of. Waste products, such as metal filings, etc., frequently become entrained in cutting oils and the like and therefore must be removed from the oils before the latter can be reused. To effect separation of the waste product from the polluted liquid, the latter is normally discharged initially into a settling tank wherein it is permitted to assume a substantially quiescent state. While in this latter state, substantially all of the heavy waste products gravitate to the bottom of the tank. A handling apparatus, such as that disclosed in my prior U.S. Pat. No. 3,303,920, may be utilized for removing the accumulated waste from the tank bottom. In handling the accumulated waste with such an apparatus, the flights are carried by a conveyor means, the latter forming a part of said apparatus, and are caused to successively sweep across the surface, engage the accumulated waste, and move the latter to a predetermined discharge station. Heretofore in flights used for this purpose, substantial overturning moments of force were encountered by each of the flights with the result that the flights and the various components parts comprising the conveyor means were required to be of very sturdy, bulky, and costly construction. One of the significant factors contributing to the substantial overturning force was the length of the moment arm of each flight.

SUMMARY OF THE INVENTION

Thus, it is an object of this invention to reduce materially the overturning moment of force encountered by the flights by reducing substantially the moment arm of each flight.

It is a further object of this invention to provide an improved flight construction which is of simple and inexpensive design and yet is effective in operation.

It is a still further object of this invention to provide a flight which may be readily assembled with or disassembled from the conveyor means.

Further and additional objects will appear from the description, accompanying drawings and appended claims.

In accordance with one embodiment of this invention a flight is provided which comprises an elongated link element and an elongated product-engaging member rigidly affixed to said element and extending transversely thereof. The link element is adapted to be connected to and form a part of the conveyor member of the product handling apparatus. The product-engaging member, on the other hand, has a length which substantially spans the width of the surface on which the waste product accumulates. An elongated first edge of the product-engaging member is disposed adjacent to the surface and is in moving contact with the waste product accumulated thereon while the flight is being moved by the conveyor means lengthwise of the surface. The product-engaging member is also provided with an elongated second edge which is remotely disposed relative to the first edge and extends forwardly of the latter. The rigid connection between the product-engaging member and the link element is recessed a substantial distance from the elongated second edge.

For a more complete understanding of the invention reference should be made to the drawings wherein:

FIG. 1 is a fragmentary vertical sectional view of a product-handling apparatus embodying the improved flights.

FIG. 2 is a fragmentary perspective top view of one form of the improved flight construction.

FIG. 3 is an enlarged side elevational view of the flight shown in FIG. 2.

FIG. 4 is a fragmentary rear elevational view of the flight of FIG. 3.

FIG. 5 is a fragmentary top view of the flight of FIG. 3.

FIG. 6 is an enlarged fragmentary side elevational view showing the waste product being removed from a flight at the discharge station of the apparatus of FIG. 1.

DESCRIPTION

Referring now the drawings and more particularly to FIG. 1, a product-handling apparatus 10 of the type disclosed in my U.S. Pat. No. 3,303,920 is shown. The apparatus 10 is adapted to be partially disposed within a settling tank 11 or the like into which a polluted liquid is directed. The polluted liquid may be a cutting oil having metal filings entrained therein; a cleaning solution having sludge-forming particles entrained therein, or various other types of liquids used in numerous manufacturing operations.

Once the polluted liquid has been deposited in the tank 11 it is permitted to remain for a predetermined time in a substantially quiescent state whereby the heavier entrained products or particles will gravitate to the bottom of the tank. The apparatus 10 is provided to facilitate handling of the products 12 subsequent to their having accumulated at the tank bottom.

Apparatus 10 basically includes a bottom panel 13 and a vertically extending wall panel 14 disposed to one side of the panel 13. The bottom panel 13 normally has a size and configuration which closely approximates that of the tank bottom. The wall panel 14, on the other hand, preferably projects above and is disposed adjacent to a side wall of the tank. The upper edge of the wall panel 14 normally terminates at a waste product discharge station 15.

In order to move the accumulated waste products towards the vertical wall panel 14 and then elevate same along the wall panel 14 to station 15, a conveyor assembly 16 is provided. During one segment 16a of travel, the conveyor assembly is disposed adjacent to and is substantially parallel to the bottom panel 13 of the tank. The conveyor assembly is power-driven so that segment 16a will move horizontally across panel 13 in a direction towards wall panel 14. The bottom of wall panel 14 is connected to bottom panel 13 by a rounded section 17. The center of curvature of section 17 is coincident to the rotary axis of an idling or guide member 18 which engages the conveyor assembly and effects a change in direction of movement of the assembly from a horizontal path to a vertical path, see directional arrows FIG. 1.

The conveyor assembly 16 in the illustrated embodiment includes a pair of endless chains A and B, see FIG. 2, which are arranged in spaced relation and are driven as a unit in parallel vertical planes. Each chain has the links thereof interrupted at predetermined locations by the improved flights 20. Each flight 20 includes a pair of elongated link elements 21 of like configuration, and an elongated product-engaging member or blade 22, the longitudinal axis of which is disposed normal to the link elements 21. The length of member 22 approximates the width of the settling tank 11.

Each link element 21 has the opposite ends 21a thereof bifurcated so as to receive the ends of complemental links a or b of the adjacent chain A or B. The ends 21a of each element 21 in addition to being bifurcated, are rounded and each segment forming the bifurcated end is provided with an opening which is adapted to receive a connecting pin 23. Thus, by reason of the pins 23 the complemental links a and b may pivot relative to the ends of the link element 21, as the flight 20 is moved through various segments of travel.

The member 22, in the illustrated embodiment, includes a lower flange 24 which is disposed within a plane normal to the longitudinal axes of the link elements 21. The lower or outer elongated edge 24a of the flange 24 is disposed in close proximity to the surface of panel 13, when the flight is moving thereacross. Waste products 12 accumulate on the panel surface and are successively engaged by the flight flanges 24 and moved thereby toward the curved section 17 and then up along sidewall panel 14.

In addition to flange 24, each member 22 includes an upper flange 25, which extends angularly forwardly from the upper edge of flange 24, see FIG. 1, 2 and 3. Flanges 24 and 25 define an obtuse included angle X, see FIG. 3. The portions of flange 25 which are aligned with chains A and B are provided with slots 25a through which the link elements 21 of the flight extend. The plane of flange 24 intersects the link elements 21 at approximately their midlengths.

Each link element 21 is affixed to member 22 by an L-shaped bracket 26. One leg 26a of bracket 26 is welded or otherwise secured to the rear surface of flange 24 and the other leg 26b thereof is secured in a like manner to the underside of link element 21, see FIG. 3. By reason of the slots 25a, the point of attachment between the member 22 and the respective link elements 21 can be lowered to a substantial extent so that the moment arm L for the flight 20, see FIG. 3, is substantially shorter than the moment arms of the prior art flights used for such purposes. By reason of the short moment arm L incorporated in flight 20, the overturning moments of force encountered by the flight, when engaging the waste products 12 accumulated on panel surface 13 and moving same across said panel surface, are substantially smaller with the result that the size, strength, etc., of each component part comprising the conveyor assembly and flights may be reduced with substantial savings in both initial and replacement costs and without impairing the utility of the conveyor assembly.

With the angular disposition of the flange 25 of the member 22, the member 22 is effective in moving waste products which have accumulated to a substantial depth on the panel surface 13. The angular disposition and dimensions of the flanges of member 22 may vary from that shown without departing from the scope of this invention.

The operation of apparatus 10 is briefly as follows: (a) the conveyor assembly 16 is driven by an elevated drive sprocket or wheel 27, which is disposed adjacent the discharge station 15, so that the conveyor assembly moves in clockwise direction as viewed in FIG. 1; (b) as the conveyor assembly moves in said clockwise direction, each flight 20 as it reaches the bottom panel 13 initially engages a portion of the waste products accumulated thereon and moves said engaged portion horizontally across said surface, around the curved section 17, and then up said wall panel 14 to the discharge station; and (c) as each waste product-carrying flight moves up past the top edge of sidewall panel 14 it is engaged by a depending arm 28 of a stripper unit 30, see FIG. 6. As the particular flight continues moving around the drive sprocket 27, the end of the arm 28 will move outwardly relative to the flight flange 24 and thus push the waste product carried thereby onto a depending chute 31 whereby the waste product is removed from the discharge station by any suitable means, not shown. The operation of the stripper unit 30 forms no part of the present invention.

The idler sprocket 18 and drive sprocket 27 are generally in substantial vertical alignment so that the outer edge 24a of the flange 24 will slidably engage the surface of the sidewall panel 14 when the flight is being moved upwardly relative to the panel 14.

The number, size, and configuration of the improved flight may vary from that illustrated in the drawings and will be determined in large measure by the size and shape of the settling tank involved and the character of the waste product to be removed.

Thus, it will be seen that an improved flight has been provided wherein the overturning moments of force exerted on the flight when in contact with the waste products will be substantially reduced. The improved flight is of simplified construction and may be formed of less bulky, lighter weight, and less expensive material without impairing the effective and usefulness of the improved flight.

I claim:

1. A flight for use in a product-handling apparatus having a substantially planar elongated surface on which the product accumulates and conveyor means having a pair of endless chains movable in unison with one another within a pair of spaced parallel planes disposed transversely of the surface, each chain during one segment of travel having a corresponding portion thereof disposed in spaced parallel relation with respect to the surface and movable lengthwise with respect thereto; said flight being of unitary construction and comprising a pair of elongated flight links, each being substituted for a corresponding link of one of the pair of chains and having the ends thereof pivotally connected to the adjacent links of the chain, and an elongated product-engaging member rigidly affixed to said flight links and extending transversely thereof so as to span substantially the width of the surface, each flight link extending forwardly and rearwardly of said product-engaging member; said product-engaging member including a first flange section disposed intermediate the ends of said flight links and substantially normal to the longitudinal axes of said flight links, said first flange section extending transversely of said flight links and having a continuous elongated edge disposed in close proximity to the surface while the flight is moving through the one segment of travel and contacting the accumulated product, a second flange section rigidly affixed to the opposite elongated edge of said first flange portion and extending angularly therefrom towards the direction of movement of said flight while in the one segment of travel, the intersection of the first and second flange sections being located on the surfaces of the corresponding flight links closest to the continuous elongated edge of said first flange section and at substantially midlength of each flight link, said second flange section being provided with openings through which portions of said flight links extend, and bracket means disposed between said flight links and and the continuous elongated edge of said first flange section for fixedly securing said first flange section to said flight links; said bracket means comprising a pair of units one for each flight link, each unit including a first bracing portion fixedly secured to the trailing surface of said first flange section, said first bracing portion extending a substantial distance towards the elongated edge of the first flange section disposed in close proximity to the surface, and a second bracing portion rigidly attached to the first bracing portion and extending rearwardly therefrom, said second bracing portion being rigidly connected to the portion of the flight link extending rearwardly from said first flange section, the rigid connection between said second bracing portion and said flight link being disposed substantially closer to the surface than the free elongated edge of said second flange section, while said flight is moving through the one segment of travel.

2. The flight of claim 1 wherein the first and second flange sections define an oblique included angle.

3. The flight of claim 1 wherein the moment arm of said flight, when the latter is in moving contact with the product, does not exceed the dimension of said first flange section taken normal to the longitudinal axis of said flight links.

* * * * *